United States Patent Office 2,819,322
Patented Jan. 7, 1958

2,819,322
PRODUCTION OF AROMATIC COMPOUNDS

Lloyd C. Fetterly, El Cerrito, Calif., assignor to Shell Development Company, New York, N. Y., a corporation of Delaware No Drawing. Application December 21, 1953
Serial No. 399,570

9 Claims. (Cl. 260—668)

This invention relates to the production of methylaromatic compounds, and more particularly to the production of such compounds which contain a further alkyl radical, such as a second methyl radical, such as paraxylene, 2,6-dimethylnaphthalene and durene.

Various methods have been proposed for the preparation of such compounds as the methylbenzene compounds. Thus, it has been proposed to chloromethylate toluene to chloromethyltoluene (alpha-chloro-xylene) and then to replace the chlorine by hydrogen, to obtain the net result of the substitution of a methyl radical for a nuclear hydrogen atom in a substituted benzene. On the other hand, it has been proposed to alkylate aromatic hydrocarbons in vapor phase with methanol, in the presence of a phosphoric acid catalyst. However, none of the methods previously proposed for the "methylation" of aromatic compounds has proven to be entirely satisfactory, for one reason or another. The methods heretofore available have failed to provide a simple, effective and economic method for the methylation of a given aromatic compound to form the monomethyl derivative thereof.

It is, therefore, a principal object of the present invention to provide an improved process for the production of methyl-substituted aromatic compounds. A further object is to provide an improved process for the introduction of a methyl radical in substitution for a nuclear hydrogen atom of an aromatic compound. A more specific object of the invention is to provide an effective and economical method for the production of nuclear methyl derivatives of benzene and naphthalene and of benzene compounds and naphthalene compounds. A still more specific object is to provide a method for the conversion of aromatic compounds which contain benzene or naphthalene nuclei and only hydrogen atoms and/or lower hydrocarbon radicals (1 to 6 carbon atoms), attached to nuclear carbon atoms of the benzene and naphthalene nuclei, into nuclearly substituted methyl derivatives thereof. A particular object is to provide a practical method for the synthesis of durene. These objects will be better understood and others will become apparent from the detailed description of the invention.

Now, in accordance with the present invention, it has been found that diarylmethane ($Ar_2CH_2$) compounds (methylenediaryls) can be converted into corresponding arylmethane ($ArCH_3$) compounds and aryl ($ArH$) compounds by cracking the compounds in admixture with hydrogen with hydrogenation at an elevated temperature and pressure and in contact with a catalyst active for aryl-methylene-carbon and aryl-carbon linkage cleavage and having hydrogenation activity. In general the high melting compounds of the group VI—VIII metals having an atomic number of at least 24 are suitable, particularly the variable valence metals. A particularly suitable catalyst for this purpose is, for example, a tungsten-nickel-sulfide catalyst such as is utilized commercially for the dehydrogenation of methylcyclohexane to toluene. The dehydrogenating metal sulfides are a preferred class of catalysts for the process, particularly the group VI metal sulfides, as, for example, the sulfides of tungsten, molybdenum and chromium, and the sulfides of metals of atomic number from 25 to 28, especially nickel sulfide. Composites of a metal sulfide from each of these groups are especially preferred. Corresponding oxides and composites thereof are also suitable catalysts for the present purpose, as well as composites of oxides and sulfides.

The diaryl methane compounds which are to be cracked in accordance with the invention, in general are preparable by the "alkylation" of the corresponding aryl compound with formaldehyde. For example, it is known to prepare diphenylmethane, ditolylmethane (mixture of isomers) and dixylylmethane, by reacting the corresponding benzene compound with formaldehyde in the presence of an acidic catalyst, such as sulfuric acid. Similarly, other compounds can be prepared, such as di-beta-naphthylmethane from naphthalene, di-beta-5,6,7,8-tetra-hydronaphthylmethane from tetralin, di-2,4,5-trimethyl-phenylmethane from pseudocumene, bis-(2,4-dimethyl-phenyl)methane from meta-xylene, bis-(beta-6-methyl-naphthyl)methane and bis-(beta-7-methylnaphthyl)methane from beta-methylnaphthalene.

Other diarylmethane compounds to be converted by the present invention can be made by the indicated alkylation with formaldehyde, as will be understood. In general, the diarylmethane compound is preferably volatile at the conditions of the reaction to be utilized.

As already indicated, the diarylmethane compounds, which may be represented by the formula 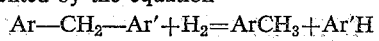, wherein the "Ar" groups are usually the same aryl radicals having the same empirical formulas, although they may be different position isomers and can be even different types of radicals, are cracked in the practice of the invention, with hydrogenation, to yield two substances, one an arylmethane ($Ar-CH_3$) and the other a corresponding aryl compound, $Ar'H$. The gross reaction can be represented by the equation $$Ar-CH_2-Ar' + H_2 = ArCH_3 + Ar'H$$

Thus, the net result of the reaction is the cleavage of a C—C bond between the methylene ($-CH_2-$) carbon and a carbon atom of one of the aromatic rings and a saturation with hydrogen of the two bond fragments. The kinetics or methanism whereby this result is effected is not clear, although it is considered to involve more than a mere carbon-to-carbon cleavage and hydrogenation. In any case, the invention is not to be limited by any theory as to its operation.

In the preparation of diarylmethanes by alkylation of aromatic compounds with formaldehyde, particularly the alkylation of alkylaromatics (e. g., toluene), generally there will be produced more or less of further alkylation products thereof. Thus, some of the diarylmethane compound is converted into a triaryl dimethane compound, a so-called "trimer," represented by

These diarylmethane (arylmethyldiarylmethane) compounds are also cracked in the same manner and under similar conditions to yield two molecules of methylaromatics and one molecule of the original aromatic. Even higher polymers are cracked similarly. It is contemplated, in the present invention to crack the mixture of dimer, trimer and other polymer which may be obtained by the alkylation, the polymer preferably being kept to a minimum.

An examination of the equations for the reactions for (1) the formation of the dimer and (2) the cracking of the dimer; namely, (1) $2ArH + CH_2O = ArCH_2Ar + H_2O$ (2) $Ar-CH_2-Ar + H_2 = ArCH_3 + ArH$ shows that the overall result is the conversion of one mole of aromatic compound (ArH) to one mole of corresponding methylaromatic or arylmethane (ArCH$_3$) for each two moles of initial aromatic feed. However, one mole of the aromatic compound is produced in the second stage, which can be recycled to the first stage. Thus, the theoretical net consumption of aromatics is one mole for each mole of desired methylaromatic produced. Therefore, a preferred method of practicing the invention comprises: (1) alkylating the aromatic compound, such as toluene, with formaldehyde to produce the diarylmethane (ditolylmethane), which will normally be a mixture of isomers (p-p', o-p, m-p) predominating in the p-p' isomer; (2) cracking the diarylmethane product, either the total alkylate, or the portion from which the higher polymers have been removed, as by distillation, to yield a mixture of isomeric methylaromatic compounds (xylenes, predominantly the para-isomer) and of corresponding aromatic compound (toluene); (3) separating the produced methylaromatics from "regenerated" aromatic as by distillation whereby the "regenerated" aromatic (toluene) is recovered as overhead distillate; (4) and recycling the "regenerated" aromatic to the alkylation step. When the alkylation results in an appreciable proportion of polymer, for example, tetramer and higher, it is preferable to separate the polymer as by distillation, and to crack the fractions separately under somewhat different conditions, because of the greater tendency of the higher boiling materials to deactivate the catalyst under the same conditions. The cracked streams are then combined and processed together.

In the preparation of xylenes, the separated xylene isomer mixture can then be de-orthoized, as by distillation, and the para-xylene readily recovered in high yield and substantially pure.

The invention is of particular utility for the production of durene, wherein pesudocumene is alkylated and the dipseudocumylmethane is hydrocracked to durene and pseudocumene. The pseudocumene can be prepared from meta-xylene by alkylation with formaldehyde and hydrocracking the alkylate, di-meta-xylylmethane (di-(2,4-dimethylphenyl) methane), by the process of this invention. Pseudocumene is also readily available in certain refinery streams, such as bottoms by-product streams from the production of aromatics, including xylenes, by various hydroforming operations. Thus, an illustrative refinery xylene bottoms by-product having a precision boiling range of about 150° C. to 205° C., has the composition as shown in Table I, with the boiling points being given for the individual components.

TABLE I

*Composition of xylene bottoms*

| Component | Percent v. | B. P., °C. at 1 atm. |
|---|---|---|
| Pseudocumene | 53 | 169.3 |
| Mesitylene | 19 | 164.8 |
| Hemimellitine | 9 | 176.1 |
| Propylbenzene: iso | } 7 | { 152 |
| N | | 159 |
| Methyl Ethyl Benzenes | 5 | 160–164 |
| C$_{10}$-Aromatics | } 7 | { 182–204 |
| Non-Aromatics | | |

By fractional distillation, the three trimethylbenzenes are easily concentrated further in a heart cut. By making the fractionation sufficiently sharp, a large proportion of the hemimellitine is also readily rejected from the pseudocumene concentrate, so that the concentrate is comprised essentially of pseudocumene and mesitylene with a very small proportion of hemimellitine and only a small proportion, not over about 1–2%, of methyl ethyl benzene. This pseudocumene concentrate is then alkylated and the resulting alkylate is hydrocracked in accordance with the invention to yield durene. The pseudocumene alkylates primarily to the bis-(2,4,5-trimethylphenyl)-methane, thus giving by hydrocracking primarily durene as the tetramethyl benzene compound, one molecule of pseudocumene being regenerated. A minor portion of the pseudocumene goes to bis-(2,3,5-trimethylphenyl)-methane, which on hydrocracking yields isodurene and pseudocumene. And a further minor portion alkylates to the mixed C$_{19}$-isomer, 2,2′,3,4′,5,5′-hexamethyldiphenylmethane, some of which on hydrocracking yields durene, in addition to "regenerated" pseudocumene, while the other yields isodurene, depending on which aromatic ring is cleaved from the methylene carbon atom. The mesitylene alkylates essentially to only one dimer, bis-(2,4,5-trimethylphenyl)methane, which hydrocracks to isodurene and mesitylene. The hemimellitine present alkylates to three dimers, which hydrocrack to "regenerate" hemimellitine and a mixture of isodurene and prehnitene. The "regenerated" trimethylbenzenes are readily separated by distillation and recycled to the alkylation, where desired. The durene (M. P. 79–80° C.) is readily crystallized in good yield from the isodurene (M. P. —24° C.) and prehnitene (M. P. —4° C.) in the separated fraction.

The cracking-hydrogenation of the diarylmethanes is readily effected by passing a suitable mixture of the feed alkylate and hydrogen over the heated catalyst at a sufficiently elevated temperature and under a suitable superatmospheric pressure. A broad range of mole ratios of hydrogen to alkylate can be utilized, in general a ratio of from about 1 to about 20 being suitable, with a ratio of from about 2 to 10, and particularly about 4 or 5, giving especially satisfactory results. The temperature in the reaction zone is advantageously maintained at about 400–450° C. with a pressure of about 250°–275 p. s. i. g., although higher and lower temperatures such as 500° C. and 350°., respectively, are effective with pressures which may be from about 100 p. s. i. g. to about 500 p. s. i. g., or even lower or higher. A contact time corresponding to a liquid hourly space velocity (LHSV) of about 5 has been found to be particularly effective although the space velocity may range suitably from a value as low as about 1-LHSV to as high as about 20-LHSV. It will be understood that the optimum set of conditions will depend on a number of variable factors, including the particular catalyst employed, the particular alkylate feed and whether it is a single compound or a mixture of polymers, the particular apparatus employed, and the like.

The cracking-hydrogenation of the diarylmethanes is slightly exothermic in character ($\Delta H$=ca. 18,000 B. t. u./lb. mol H$_2$ reacted) although usually of such a small amount that no particular problem of heat removal is presented. The feed mixture of alkylate and hydrogen is normally preheated to about the reaction temperature prior to contacting it with the catalyst.

The reaction can be suitably carried out by passing the alkylate and hydrogen over or through a fixed bed or mass of the catalyst in particulate form, such as a bed of pellets or a packed section thereof in a confined reaction zone. On the other hand, the reaction can be readily carried out by passing the preheated mixture of alkylate and hydrogen through a fluidized catalyst mass, and the temperature of the catalyst mass can be readily controlled by any suitable means, such as by providing heat transfer tubes disposed in the catalyst zone or by cycling a portion of the catalyst to an external heat exchanger and back to the reaction zone.

The following detailed description of illustrative examples of the practice of the invention are given for the purpose of a better understanding thereof and are not to be considered as limitative thereon.

EXAMPLE I (A) *Alkylation of toluene.*—Toluene was alkylated with aqueous 37% formaldehyde (formalin) using aqueous 60–70% sulfuric acid as catalyst at 80° C.–100° C. and 10–30 minutes contact time. The recovered alkylate in this case consisted of ditolylmethane (DTM), tritolyldimethane (trimer) and heavier polytolylpolymethane in a weight ratio of 62:12:26, respectively. The yield of mixed alkylate was 99–100%, based on toluene converted and 95–100%, based upon the formaldehyde. Since the sulfuric acid is relatively dilute, little if any sulfonation of toluene or product occurred and acid consumption was negligible.

The dimer, trimer and higher polymer are readily separable by distillation. The dimer (DTM) fraction contained an isomer distribution of approximately 60% p-p', 35% o-p' and 5% m-p', as determined by infrared analyses and from analyses of the products from subsequent cracking in accordance with the invention.

(B) *Alkylation of toluene.*—Toluene was alkylated with formaldehyde in the presence of a sulfuric acid, methanol, water mixture and summarized in the following tabulation:

| | |
|---|---|
| Temperature | 90–100° C. |
| Pressure | Atmospheric. |
| Catalyst composition, percent w | $H_2SO_4$—63. |
| | $CH_3OH$—20. |
| Product distribution, percent w. | Dimer—81. |
| | Trimer—14.4. |
| | Higher mol wt. 4.6. |
| Yield based on toluene | 96.9% m. |
| Yield based on formaldehyde | 96.4% m. |
| Methanol recovery | 57+percent m. as $CH_3OH$. |
| | 41% m. as $CH_3OH$—$H_2SO_4$ reaction product. |
| Sulfuric acid recovery | 66.7% w. as titratable acid. |
| | 33.3% w. as $CH_3OH$—$H_2SO_4$. |
| Reaction time | 20 minutes. |
| Conversion of toluene | 45% w. |

(C) *Alkylation of toluene.*—When toluene was alkylated with formalin to a 23.5% alkylate level (conversion) in toluene with a reaction time of 30 minutes and using a 1:1 volume mixture of 96% $H_2SO_4$ and methanol as catalyst, the distribution ratio of 85:15:0 for dimer:trimer:higher, respectively, was obtained. The yield of product, based upon toluene and formaldehyde converted, was above 96%.

A product having a distribution ratio 90:7:3 of dimer:trimer:polymer was obtained at a 41% alkylate level and a reaction time of 15 minutes when using a 1:1.1 volume ratio of 96% $H_2SO_4$ and methanol as catalyst.

(D) *Alkylation of xylenes.*—The three isomeric xylenes, o-, m- and p-, were separately alkylated with formaldehyde, using sulfuric acid as catalyst in aqueous methanol solvent. The product distributions in the alkylates of the three cases are tabulated in Table II.

TABLE II

| Xylene Alkylated | Methyl Positions on Diphenylmethane | Percent, mol |
|---|---|---|
| o-xylene | 3,4,3',4' | ca. 93 |
| | 3,4,2',3' | 6 |
| | 2,3,2',3' | 1 |
| m-xylene | 2,4,2',4' | 90 |
| | 2,4,2',6' | 9 |
| | 2,4,3',5' | 1 |
| p-xylene | 2,4,2',4' | 100 |

(E) *Alkylation of pseudocumene.*—Pseudocumene (1,2,4-trimethylbenzene) was alkylated with formaldehyde in the presence of aqueous methanolic sulfuric acid as catalyst, at a temperature of 50–80° C. and a reaction time of 20 minutes. A yield of 99%, based on converted pseudocumene, was obtained, of a product which, when recrystallized had the following properties: melting point, 70–72° C.; mol. wt.=ca. 250; molecular formula—$C_{19}H_{24}$. From analyses, including the fact that the tetramethylbenzene product obtained by cracking it by the process of this invention was predominately durene, this product was considered to be predominately bis-(2,4,5-trimethylphenyl)methane. About 8% by weight of isomeric material was obtained, an approximately equal mixture of the isomers, bis-(2,3,5-trimethylphenyl)-methane and 2,2',3,4',5,5'-hexamethyldiphenylmethane.

EXAMPLE II (A) Ditolylmethane was hydrocracked in admixture with hydrogen by passing it over a tungsten-nickel-sulfide pelleted catalyst at 400° C., 260 p. s. i. g. pressure, LHSV of 5 and a hydrogen to ditolylmethane mole ratio of 4. The feed was 50 to 75% converted to other products with 100% yield. The hydrocracking was carried out by vaporizing the ditolylmethane, mixing it with the hydrogen, preheating the mixture to about the reaction temperature, and passing the mixture over the catalyst packed in a steel reaction tube, while maintaining the temperature at the selected value. The product was fractionated by distillation with the recovery of 61% w. low boiling fraction which contained 53% xylene and 46% toluene and 39% w. higher boiling components comprising predominantly dimer and trimer (88:12 ratio). The xylene product isomer distribution was about 75% p-xylene, 22% ortho-xylene and 3% m-xylene.

(B) A portion of the total alkylate of Example I-A was hydrocracked under the same conditions as in II-A. In this case the total yield of low boiling product was 32% by weight, containing 63% w. xylene and 37% w. toluene, and 68% higher boiling material. The fact that the xylene content was greater than the toluene content is the result of cracking of alkylates higher than "dimer." Thus, a "trimer" yields two mols of xylene per mol of toluene.

EXAMPLE III

The recrystallized bis-(2,4,5-trimethylphenyl)methane product from Example I-E, and having a melting point of 70–72° C. was hydrocracked over a W/Ni/S catalyst at about 450° C., a pressure of about 600 p. s. i. g. and a mole ratio of hydrogen to alkylate of 10 to 1, respectively. Durene was recovered from the product in a yield of above 95% based on the pseudocumene alkylate converted, at a conversion level of about 91%. The other product was essentially all pseudocumene, with a very small proportion of isodurene and prehnitene being present.

EXAMPLE IV

The remainder of the pseudocumene alkylate from Example I-E was hydrocracked similar to Example III. The product from the cracking was predominantly durene with minor proportions of isodurene and prehnitene, but larger proportions than in Example III, in addition to pseudocumene.

EXAMPLE V

When a 162° C. to 173° C. distillate fraction from a refinery xylene bottoms product, as described in Table I, and containing about 90% pseudocumene is alkylated with formaldehyde in the presence of sulfuric acid—aqueous methanol as catalyst, an alkylate product comprising essentially "dimers" is readily obtained. The hydrocracking of this "alkylate" over a W/Ni/S catalyst under a pressure of about 600 p. s. i. g. and at a temperature of about 450° C., with a mole ratio hydrogen/alkylate of about 5, yields a mixture composed essentially of tri- and tetra-methylbenzene compounds. The trimethylbenzenes are readily separated by distillation as distillate for recycle to alkylation, to give a residual mixture composed essentially of durene, isodurene and prehnitene. The durene is readily recovered in a yield of about 83 mol percent, based on trimethylbenzenes consumed.

About 17 mol percent of a mixture of isodurene and prehnitene are recovered, being about 10% isodurene and 7% prehnitene. The prehnitene (M. P.=−4° C.) and isodurene (M. P.=−24° C.) are separable by fractional crystallization.

EXAMPLE VI

When the mixture of isodurene, prehnitene and unseparated durene from Example V is alkylated with formaldehyde and alkylate, bis-(2,3,4,6-tetramethylphenyl)methane is obtained which has a melting point above 150° C. and is slightly soluble in toluene. When this alkylate is hydrocracked similar to the process of Example V, pentamethylbenzene is obtained as product admixed with a mixture of isodurene, prehnitene and durene. The pentamethylbenzene (M. P. 53° C.) is readily recovered by crystallization and filtration or centrifugation.

EXAMPLE VII

Hydrocracking of bis-(6(or 7)methylnaphth-2-yl)methane.

When beta-methylnaphthalene is methylated with formaldehyde, utilizing methanolic sulfuric acid as catalyst, a mixture is obtained composed essentially of bis-(6(and 7)-methylnaphth-2-yl)methane and the mixed isomer thereof, namely, 6,7'-dimethyl-naphth-2-yl methane. Hydrocracking of this product under the conditions of Example V yields predominantly a mixture of 2,6- and 2,7-dimethylnaphthalene, in addition to the "regenerated" beta-methylnaphthalene.

EXAMPLE VIII

When di-p-tolylmethane is hydrocracked under conditions similar to those of Example II, but the catalyst is pelleted molybdenum disulfide instead of the tungsten-nickel-sulfide catalyst, similar results are obtained but at a slightly different conversion.

EXAMPLE IX

When Example II is repeated except that the catalyst charged to the reactor is a mixture of nickel and tungsten oxides (nickel tungstate) and a small amount of hydrogen sulfide is incorporated in the feed stream (about 1 mol percent), the ditolylmethane is hydrocracked in essentially the same manner as in Example II.

EXAMPLE X

When Example II is repeated except that the catalyst employed is a composited cobalt oxide-molybdenum oxide (Co/Mo/O) catalyst, the di-p-tolylmethane is readily converted in similar proportions to paraxylene and toluene.

The invention claimed is:

1. A process for the preparation of a polymethylbenzene having from three to five methyl groups which comprises hydrocracking a diarylmethane in which each aryl group is a methyl substituted phenyl group having from two to four methyl group substituents at an elevated temperature and a pressure from about 100 to about 600 lbs./sq. in., gauge, in the presence of from about one to about twenty moles of hydrogen per mole of diarylmethane and a high melting inorganic compound selected from the group consisting of oxides, sulfides and composites thereof of group VI and VIII metals having atomic numbers of at least 24, as catalyst.

2. A process in accordance with claim 1, wherein the temperature is from about 350° to about 500° C.

3. A process in accordance with claim 1, wherein the polymethylbenzene is pseudocumene and the diarylmethane is di-(2,4,-dimethylphenyl)methane.

4. A process for the preparation of durene which comprises hydrocracking bis-(2,4,5-trimethylphenyl)methane at an elevated temperature and a pressure from about 100 to about 600 lbs./sq. in., gauge, in the presence of from about one to about twenty moles of hydrogen per mole of bis-(2,4,5-trimethylphenyl)methane and a high melting inorganic compound selected from the group consisting of oxides, sulfides and composites thereof of group VI and VIII metals having atomic numbers of at least 24, as catalyst.

5. A process for the preparation of a polymethylbenzene having from three to five methyl groups which comprises hydrocracking a diarylmethane in which each aryl group is a methyl substituted phenyl group having from two to four methyl group substituents at a temperature of from about 350° to about 500° C. and at a pressure from about 100 to about 600 lbs./sq. in., gauge in the presence of from one to twenty moles of hydrogen per mole of diarylmethane and a tungsten-nickel-sulfide catalyst.

6. A process for the preparation of pseudocumene which comprises hydrocracking di-(2,4-dimethylphenyl)methane at an elevated temperature and a pressure from about 100 to about 600 lbs./sq. in., gauge, in the presence of from about one to about twenty moles of hydrogen per mole of the methane compound and a trungsten-nickel-sulfide catalyst.

7. A process for the preparation of durene which comprises hydrocracking bis-(2,4,5-trimethylphenyl)methane at an elevated temperature and a pressure from about 100 to about 600 lbs./sq. in., gauge, in the presence of from about one to about twenty moles of hydrogen per mole of the methane compound and a tungsten-nickel-sulfide catalyst.

8. A process for the preparation of pentamethylbenzene which comprises hydrocracking bis-(2,3,4,5-tetramethylphenyl)methane at an elevated temperature and a pressure from about 100 to about 600 lbs./sq. in., gauge, in the presence of from about one to about twenty moles of hydrogen per mole of the methane compound and a tungsten-nickel-sulfide catalyst.

9. A process for the preparation of a polymethylbenzene having from three to five methyl groups which comprises hydrocracking a diarylmethane in which each aryl group is a methyl substituted phenyl group having from two to four methyl group substituents at a temperature of from about 350° to about 500° C. and at a pressure from about 100 to about 600 lbs./sq. in., gauge in the presence of from one to twenty moles of hydrogen per mole of diarylmethane and a cobalt-molybdenum-oxide catalyst.

References Cited in the file of this patent

UNITED STATES PATENTS

| | | |
|---|---|---|
| 2,338,973 | Schmerling | Jan. 11, 1944 |
| 2,394,751 | Cole | Feb. 12, 1946 |
| 2,414,620 | Trimble | Jan. 21, 1947 |
| 2,660,572 | Feasley | Nov. 24, 1953 |

OTHER REFERENCES

Globus et al.: Journal of Applied Chemistry (U. S. S. R.), vol. 17, pages 623–628 (1944). (Abstracted in Chemical Abstracts, vol. 40 (1946), column $2133^{3-5}$.)